(12) United States Patent
Hu et al.

(10) Patent No.: US 11,044,473 B2
(45) Date of Patent: *Jun. 22, 2021

(54) ADAPTIVE LOOP FILTERING CLASSIFICATION IN VIDEO CODING

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,552

(22) Filed: Dec. 18, 2019

(65) Prior Publication Data

US 2020/0204801 A1      Jun. 25, 2020

Related U.S. Application Data

(60) Provisional application No. 62/784,287, filed on Dec. 21, 2018.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/186* (2014.11); *H04N 19/30* (2014.11); *H04N 19/423* (2014.11)

(58) Field of Classification Search
None
See application file for complete search history.

(56) References Cited

U.S. PATENT DOCUMENTS

| 5,557,684 A * | 9/1996 | Wang ........................ G06K 9/38 |
| | | 348/E5.066 |
| 7,394,856 B2 * | 7/2008 | Bhaskaran ........... H04N 19/176 |
| | | 348/620 |

(Continued)

FOREIGN PATENT DOCUMENTS

CA          3011867 A1     8/2017

OTHER PUBLICATIONS

Kotra A., et al., "CE5-2: Loop filter line buffer reduction," JVET-N0180, Joint Video Experts Team (JVET) of ITU-T SG 16 WP 3 and ISO/IEC JTC 1/SC 29/WG 11, JVET-N0180-V2, 14th Meeting: Geneva, CH, Mar. 19-27, 2019, pp. 1-9.

(Continued)

*Primary Examiner* — Tyler W. Sullivan
(74) *Attorney, Agent, or Firm* — Espartaco Diaz Hidalgo

(57) ABSTRACT

A video encoder and/or video decoder are configured to apply an adaptive loop filter to a reconstructed block of video data. The video encoder and/or video decoder may be configured to determine gradient values for a window that covers the reconstructed block of video data, determine a scaling factor for the gradient values based on a number of available pixels in the window that are on a same side of a virtual boundary as the reconstructed block, and scale the gradient values based on the scaling factor. The video encoder and/or video decoder may determine a class of adaptive loop filter based on the scaled gradient values.

23 Claims, 13 Drawing Sheets

(51) Int. Cl.
  *H04N 19/30*  (2014.01)
  *H04N 19/186*  (2014.01)
  *H04N 19/423*  (2014.01)

(56) References Cited

U.S. PATENT DOCUMENTS

| | | | | |
|---|---|---|---|---|
| 8,295,633 | B2* | 10/2012 | Sangkeun | H04N 19/117 382/268 |
| 9,167,269 | B2* | 10/2015 | Van der Auwera | H04N 19/136 |
| 9,641,866 | B2 | 5/2017 | Chong et al. | |
| 10,721,469 | B2* | 7/2020 | Zhang | H04N 19/563 |
| 2013/0044809 | A1* | 2/2013 | Chong | H04N 19/182 375/240.03 |
| 2013/0128986 | A1 | 5/2013 | Tsai et al. | |
| 2013/0272624 | A1* | 10/2013 | Budagavi | H04N 19/192 382/239 |
| 2014/0003496 | A1* | 1/2014 | Kondow | H04N 19/14 375/240.02 |
| 2015/0264406 | A1* | 9/2015 | Kim | H04N 19/182 375/240.29 |
| 2016/0241881 | A1* | 8/2016 | Chao | H04N 19/182 |
| 2017/0238020 | A1 | 8/2017 | Karczewicz et al. | |
| 2019/0166363 | A1 | 5/2019 | Zhang et al. | |
| 2019/0281273 | A1* | 9/2019 | Lin | H04N 5/23238 |
| 2020/0074687 | A1* | 3/2020 | Lin | G06T 3/40 |
| 2020/0260120 | A1* | 8/2020 | Hanhart | H04N 19/82 |
| 2020/0296425 | A1* | 9/2020 | Seregin | H04N 19/182 |

OTHER PUBLICATIONS

Kotra A.M., et al., "Non-CE: Loop filter line buffer reduction," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0301-V2, pp. 1-12.

Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-d2, 43 pages.

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Bross B., et al., "Versatile Video Coding (Draft 7)", Joint Video Experts Team (JVET) of ITU-T SG 16 WP 3 and ISO/IEC JTC 1/SC 29/WG 11, JVET-P2001-v9, 16th Meeting: Geneva, CH, Oct. 1-11, 2019, 490 pages.

Chen C Y., et al., "Non-CE8.c.7: Single-Source SAO and ALF Virtual Boundary Processing with Cross9x9," Joint Collaborative Team on Video Coding (JCT-VC) of ITU-T SG16 WP3 and ISO/IEC JTC1/SC29/WG11, 7th Meeting Geneva, CH, Nov. 21-30, 2011, JCTVC-G212_r1, pp. 1-25.

Chen, et al., "Adaptive Loop Filter with Zero Pixel Line Buffers for LCU-based Decoding," Source: MediaTek Inc., JCTVC-F054, ITU-T SG16 WP3 and ISO/IEC JTC1/SC29/WG11, fith Meeting: Torino, IT, Jul. 14-22, 2011, 11 pages.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm Description of Joint Exploration Test Model 1," 1, JVET Meeting; Oct. 19, 2015-Oct. 21, 2015; Geneva, CH (The Joint Video Exploration Team of ISO/IEC JTC1/SC29/WG11 and ITU-T SG.16 ); URL: http://phenix.int-evry.fr/jvet/, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 pages, XP030150980, pp. i-iv, Retrieved from the Internet: URL: http://phenix.int-evry.fr/jvet/doc_end user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

Ergen S., "ZigBee/IEEE 802.15.4 Summary", Sep. 10, 2004, 37 Pages.

IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks—Specific requirements; Sponsored by LAN/MAN Standards Committee; IEEE Standard 802.11acTM—2013, Published on Dec. 18, 2013, 425 Pages.

International Search Report and Written Opinion—PCT/US2019/067569—ISA/EPO—dated Mar. 20, 2020.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Karczewicz M., et al., "EE2.5: Improvements on Adaptive Loop Filter," Joint Video Exploration Team (JVET) of ITU-T SG 16 WP 3 and ISO/IEC JTC 1/SC 29/WG 11, Document: JVET-00038, 3rd Meeting: Geneva, CH, May 26-Jun. 1, 2016, 4 pages.

Karczewicz M., et al., "Geometry Transformation-based Adaptive In-Loop Filter," Picture Coding Symposium, IEEE, Dec. 4-7, 2016, pp. 1-5, XP033086856, DOI: 10.1109/PCS.2016.7906346, [retrieved on Apr. 19, 2017], Section III.

Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/ ., No. JVET-B0060, 6 pages.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Wiegand., et al., "WD3: Working Draft 3 of High-Efficiency Video Coding," Document JCTVC-E603, 5th Meeting: Geneva, CH, Mar. 16-23, 2011, 193 pp.

JEM7 referred to as J. Chen, E. Alshina, G. J. Sullivan, J.-R. Ohm, J. Boyce "Algorithm description of Joint Exploration Test Model 7 (JEM7)" JVET-G1001, Torino, Jul. 2017.

JVET-J1001 "Versatile Video Coding (Draft 1)" by Benjamin Bross [Specification Paragraph 39].

M. Karezewicz, L. Zhang, W.-J. Chien, X. Li, EE2.5: Improvements on adaptive loop filter, Exploration Team (JVET) of ITU-T SG 16 WP 3 and ISO/IEC JTC 1/SC 29/WG 11, Doc. JVET-BO060, 2nd Meeting: San Diego, USA, Feb. 20-Feb. 26, 2016.

"JVET-B0060—Improvements on Adaptive Loop Filter", Marta Karczewicz, Li Zhang, Wei-Jung Chien, Xiang Li.

* cited by examiner

ALF FILTER SUPPORTS

5X5 Diamond

7x7 Diamond

Truncated 9x9 Diamond

FIG. 3

ADAPTIVE LOOP FILTERING CLASSIFICATION IN VIDEO CODING

This application claims the benefit of U.S. Provisional Application No. 62/784,287, filed Dec. 21, 2018, the entire content of which is incorporated by reference herein.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to filters for use in video coding. In particular, this disclosure describes techniques for determining a class of an adaptive loop filter (ALF). In some examples, when determining a class of ALF to use for a block of pixels that is near a coding tree unit (CTU), not all pixels that are used for determining the class of ALF are available. In particular, not all pixels within a window around the block that are used for determining gradients and a directionality (which is then used to determine the class of ALF) of the block may be available. A video coder may be configured to pad the unavailable pixel values with default pixel values or with available pixel values from the block. However, using such values for determining the gradients and directionality may lead to less than optimal results for the directionality, and potentially, a less than optimal class of ALF.

This disclosure describes techniques for determining gradients (or Laplacian values) for a block of pixels where padded pixels are not used. Furthermore, video encoder and/or a video decoder may determine a scaling factor based on a number of available pixels in the window that are on a same side of a virtual boundary as the reconstructed block used to determine the gradients and may apply this scaling factor to any calculated gradients. In this way, the accuracy of the gradients, directionality, and class of ALF may be improved. The techniques of this disclosure may be used in the context of advanced video codecs, such as H.265/HEVC and H.266/VVC (versatile video coding).

In one example, this disclosure describes an apparatus configured to code video data, the apparatus comprising a memory configured to store a block of video data, and one or more processors, implemented in circuitry, in communication with the memory. The one or more processors configured to reconstruct the block of video data to create a reconstructed block of video data, determine gradient values for a window that covers the reconstructed block of video data, wherein the window includes pixels of the reconstructed block of video data and pixels that surround the reconstructed block of video data, determine a scaling factor for the gradient values based on a number of available pixels in the window that are on a same side of a virtual boundary as the reconstructed block, scale the gradient values based on the scaling factor to produce scaled gradient values, wherein the scaled gradient values (also called Laplacian values) indicate a directionality for the reconstructed block of video data, determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data.

In another example, this disclosure describes a method of coding video data, the method comprising reconstructing the block of video data to create a reconstructed block of video data, determining gradient values for a window that covers the reconstructed block of video data, wherein the window includes pixels of the reconstructed block of video data and pixels that surround the reconstructed block of video data, determining a scaling factor for the gradient values based on a number of available pixels in the window that are on a same side of a virtual boundary as the reconstructed block, scaling the gradient values based on the scaling factor to produce scaled gradient values, wherein the scaled gradient values indicate a directionality for the reconstructed block of video data, determining an activity index for the reconstructed block of video data, determining a class of adaptive loop filter for the reconstructed block of video data based on the directionality and the activity index, and applying the determined class of adaptive loop filter to the reconstructed block of video data to generate a filtered block of video data.

In another example, this disclosure describes an apparatus configured to code video data, the apparatus comprising means for reconstructing the block of video data to create a reconstructed block of video data, means for determining gradient values for a window that covers the reconstructed block of video data, wherein the window includes pixels of the reconstructed block of video data and pixels that surround the reconstructed block of video data, means for determining a scaling factor for the gradient values based on a number of available pixels in the window that are on a same side of a virtual boundary as the reconstructed block, means for scaling the gradient values based on the scaling factor to produce scaled gradient values, wherein the scaled gradient values indicate a directionality for the reconstructed block of video data, means for determining an activity index for the reconstructed block of video data, means for determining a class of adaptive loop filter for the reconstructed block of video data based on the directionality and the activity index, and means for applying the determined class of adaptive loop filter to the reconstructed block of video data to generate a filtered block of video data.

In another example, this disclosure describes a non-transitory computer-readable storage medium storing instructions that, when executed, cause one or more processors configured to code video data to reconstruct the block of video data to create a reconstructed block of video data, determine gradient values for a window that covers the reconstructed block of video data, wherein the window includes pixels of the reconstructed block of video data and pixels that surround the reconstructed block of video data, determine a scaling factor for the gradient values based on a number of available pixels in the window that are on a same side of a virtual boundary as the reconstructed block, scale the gradient values based on the scaling factor to produce scaled gradient values, wherein the scaled gradient values indicate a directionality for the reconstructed block of video data, determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 3 illustrates three different example Adaptive Loop Filter (ALF) filter supports.

DETAILED DESCRIPTION

Figure 1:
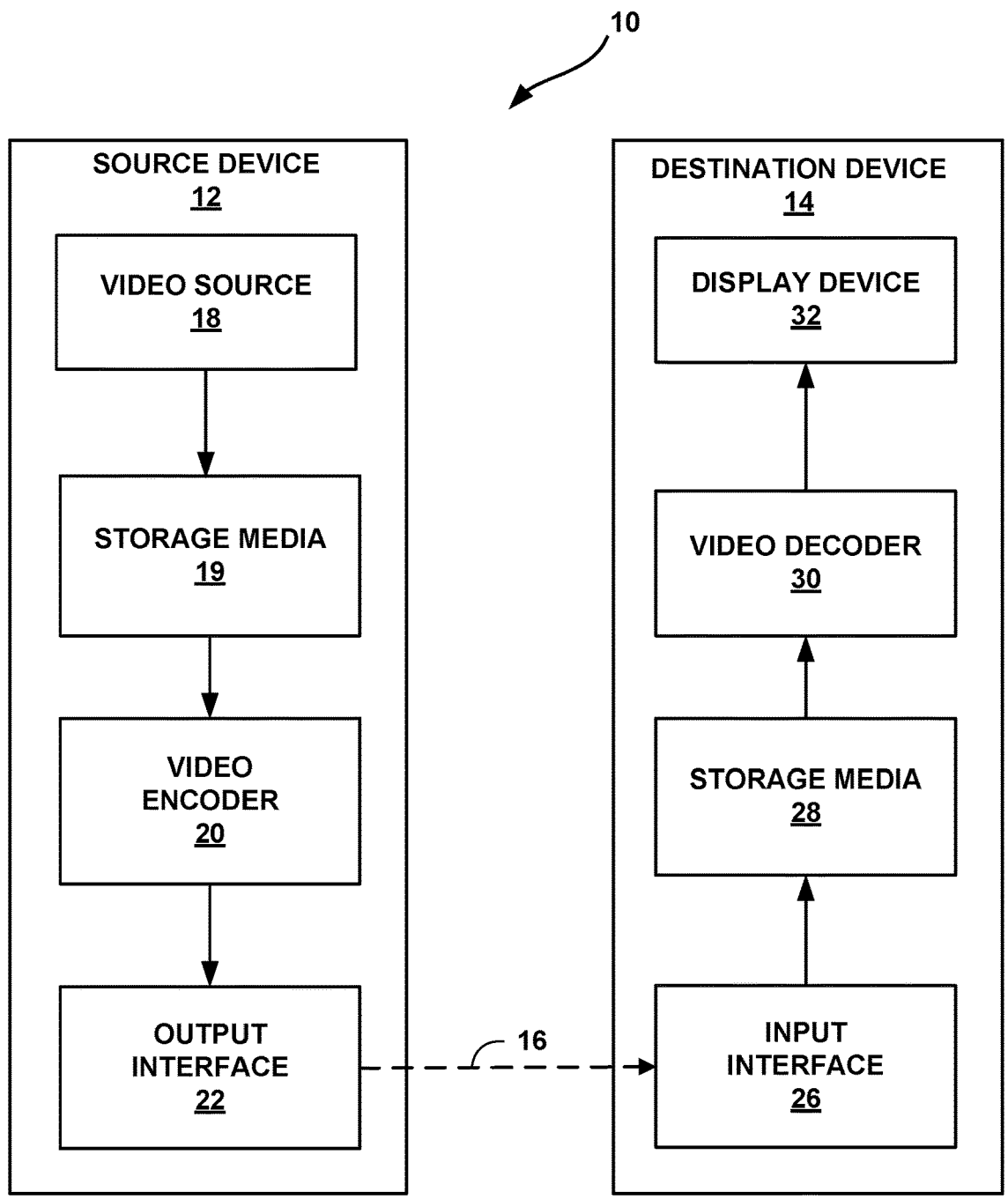
FIG. 1 is a block diagram illustrating an example video encoding and decoding system that may use one or more techniques described in this disclosure.

FIG. 1 is a block diagram illustrating an example video encoding and decoding system 10 that may use techniques of this disclosure for determining a class of adaptive loop filter (ALF) for filtering a reconstructed block of video data. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for encoding, decoding, and processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes video source 18, storage media 19 configured to store video data, video encoder 20, and output interface 22. Destination device 14 includes input interface 26, storage media 28 configured to store encoded video data, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZIGBEE™), a BLUETOOTH™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

Computer-readable medium 16 may include transient media, such as a wireless broadcast or wired network transmission, or storage media (that is, non-transitory storage media), such as a hard disk, solid state drive, flash drive, compact disc, digital video disc, BLU-RAY DISC™, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of any of various forms, in various examples.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, solid state drive, BLU-RAY DISC™, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, optical fiber, etc.), or a combination of both that is suitable for accessing encoded video data stored on a file server. The transmission of encoded video data from the storage device may be a streaming transmission, a download transmission, or a combination thereof.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), an optical networking card, or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g. ZIGBEE™), a BLUETOOTH™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable processing circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to one or more video coding standards or specifications. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC) standard, which as known as ITU-T H.265, its range and screen content coding extensions, its 3D video coding extension (3D-HEVC), its multiview extension (MV-HEVC), or its scalable extension (SHVC).

ITU-T VCEG (Q6/16) and ISO/IEC MPEG (JTC 1/SC 29/WG 11) studied the need for standardization of future video coding technology with a compression capability that exceeds that of the current HEVC standard (including its current extensions and near-term extensions for screen content coding and high-dynamic-range coding). The groups worked together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 7 (JEM7) can be downloaded by navigating to the svn/HM-16.6-JEM-7.0 folder at the jvet.hhi.fraunhofer.de website. This algorithm description for JEM7 can be referred to as J. Chen, E. Alshina, G. J. Sullivan, J.-R. Ohm, J. Boyce "Algorithm description of Joint Exploration Test Model 7 (JEM7)", JVET-G1001, Torino, July 2017.

An early draft for the new video coding standard stemming from the exploration, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). The techniques of this disclosure, however, are not limited to any particular coding standard.

The techniques of this disclosure may be used in the context of advanced video codecs, such as extensions of HEVC or next generation video coding standards (e.g., H.266/VVC). While the techniques of this disclosure are generally described with reference to HEVC and next generation video coding standards (e.g., VVC/JEM), it should be understood that the techniques of this disclosure may be used in conjunction with any video coding techniques that use loop filters, including ALFs, sample adaptive offset (SAO) filters, and/or deblocking filters.

As will be explained in more detail below, video encoder 20 and video decoder 30 may be configured to reconstruct a block of video data to create a reconstructed block of video data, determine gradient values for a window that covers the reconstructed block of video data, wherein the window includes pixels of the reconstructed block of video data and pixels that surround the reconstructed block of video data, determine a scaling factor for the gradient values based on a number of available pixels in the window that are on a same side of a virtual boundary as the reconstructed block, scale the gradient values based on the scaling factor to produce scaled gradient values, wherein the scaled gradient values indicate a directionality for the reconstructed block of video data, determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

In HEVC, VVC, and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as one or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

Video encoder 20 may generate one or more residual blocks for a CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

In JEM7, rather than using the quadtree partitioning structure of HEVC described above, a quadtree binary tree (QTBT) partitioning structure may be used. The QTBT structure removes the concepts of multiple partition types. That is, the QTBT structure removes the separation of the CU, PU, and TU concepts, and supports more flexibility for CU partition shapes. In the QTBT block structure, a CU can have either a square or rectangular shape. In one example, a CU is first partitioned by a quadtree structure. The quadtree leaf nodes are further partitioned by a binary tree structure.

In some examples, there are two splitting types: symmetric horizontal splitting and symmetric vertical splitting. The binary tree leaf nodes are called CUs, and that segmentation (i.e., the CU) is used for prediction and transform processing without any further partitioning. This means that the CU, PU, and TU have the same block size in the QTBT coding block structure. In JEM, a CU sometimes consists of coding blocks (CBs) of different color components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices.

Figure 2A:
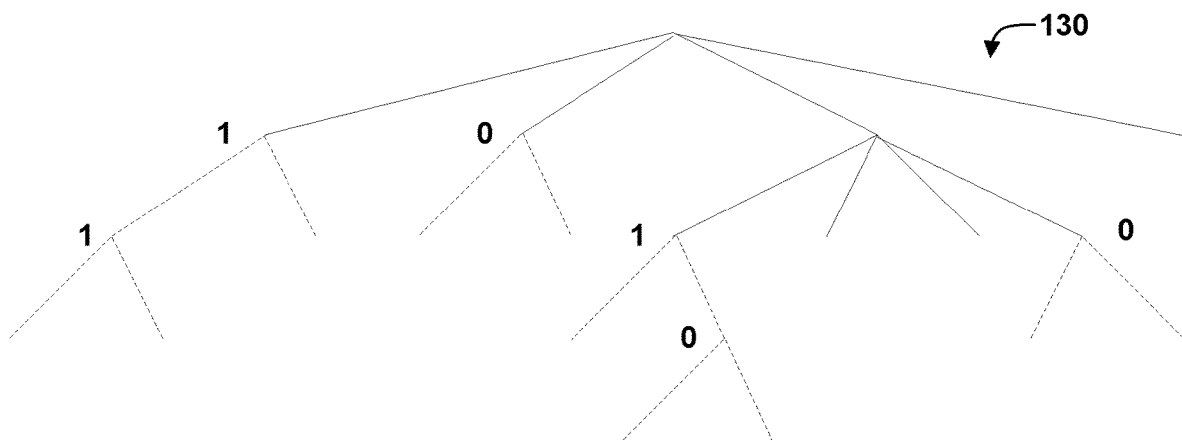
FIGS. 2A and 2B are conceptual diagrams illustrating an example quadtree binary tree (QTBT) structure, and a corresponding coding tree unit (CTU).
Figure 2B:
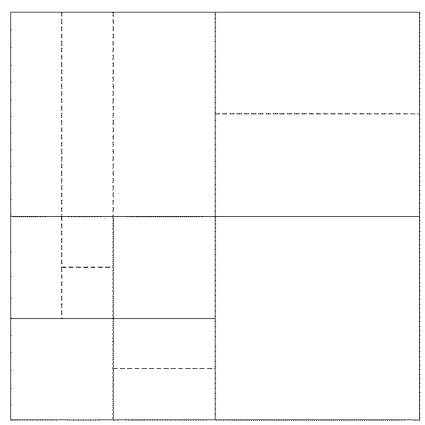

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single Network Abstraction Layer (NAL) unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

Adaptive Loop Filter (ALF)

In the field of video coding, it is common to apply filtering (e.g., an ALF) in order to enhance the quality of a reconstructed and/or decoded video signal. In the context of this disclosure, a reconstructed block of video data may refer to a block of video data that has been reconstructed in the reconstruction loop of video encoder 20, or may refer to a block of video data that is decoded by video decoder 30. In some examples, a filter may be applied as a post-filter, where the filtered frame is not used for prediction of future frames, or a filter may be applied as an in-loop filter, where the filtered frame is used to predict future frames. A filter can be designed, for example, by minimizing the error between the original signal and the reconstructed/decoded filtered signal. Similarly to transform coefficients, video encoder 20 may quantize code the coefficients of the filter h(k, l), k=−K, . . . , K, l=−K, . . . K by:

$$f(k,l) = \text{round}(\text{normFactor} \cdot h(k,l))$$

Video encoder 20 may send the coded quantized coefficients to video decoder 30. The normalization factor (normFactor) may be equal to $2^n$. The larger the value of normFactor, the more precise is the quantization and the quantized filter coefficients f(k, l) provide better performance. However, larger values of normFactor produce coefficients f(k, l) requiring more bits to transmit.

In video decoder 30, the decoded filter coefficients f(k, l) are applied to the reconstructed image/block R(i, j) as follows:

$$\tilde{R}(i,j) = \sum_{k=-K}^{K}\sum_{l=-K}^{K} f(k,l)R(i+k,j+l) / \sum_{k=-K}^{K}\sum_{l=-K}^{K} f(k,l), \qquad (1)$$

where i and j are the coordinates of the pixels within the frame or block.

ALF in VVC

The in-loop ALF was evaluated during the HEVC development stage, but ALF was not included in the final version of the HEVC standard. However, the in-loop ALF has been adopted to VVC. Example details can be found in B. Bross, J. Chen, S. Liu, "JVET-L1001: Versatile Video Coding (Draft 3)", which is a simplified version of ALF described in M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-B0060, $2^{nd}$ Meeting: San Diego, USA, 20-26 Feb. 2016 and M. Karczewicz, L. Zhang, W.-J. Chien, X. Li, "EE2.5: Improvements on adaptive loop filter", Exploration Team (JVET) of ITU-T SG 16 WP 3 and ISO/IEC JTC 1/SC 29/WG 11, Doc. JVET-O0038, $3^{rd}$ Meeting: Geneva, CH, 26 May-1 Jun. 2016.

Figure 3:
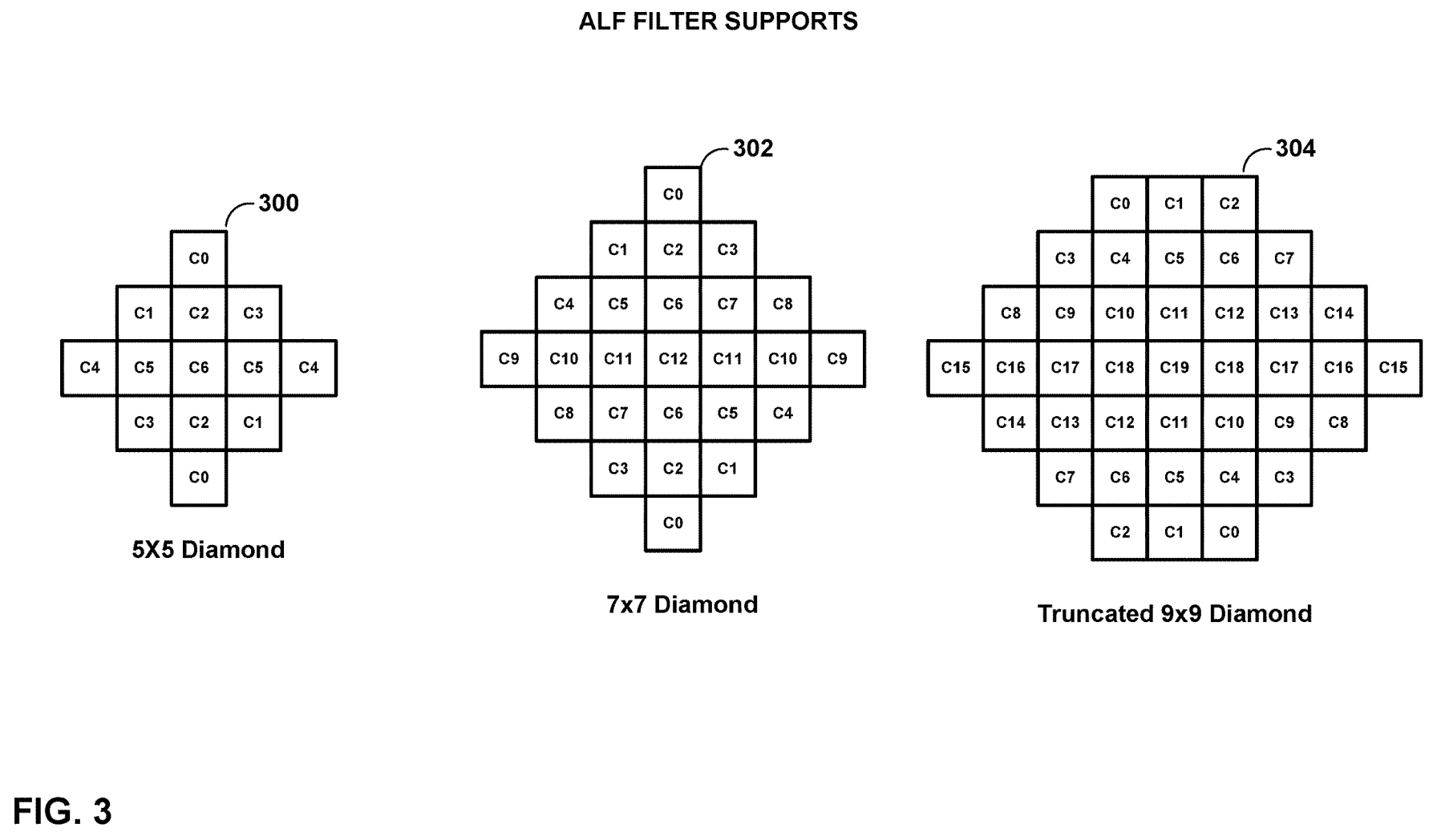

For luma components in a picture, video encoder 20 and video decoder 30 may be configured to apply 7×7 diamond shape filter 302 for ALF, as shown in FIG. 3. For both chroma components (e.g., Cr and Cb) in a picture, video encoder 20 and video decoder 30 may be configured to apply a single set of ALF coefficients, and the 5×5 diamond shape filter 300, as shown in FIG. 3, is always used. Other filter shapes may be use, including truncated 9×9 diamond filter shape 304 shown in FIG. 3.

At video decoder 30, each pixel sample $\hat{I}_{i,j}$ is filtered, resulting in pixel value $I'_{i,j}$ as shown in equation (2), where L denotes filter length, $f_{m,n}$ represents filter coefficient and o indicates filter offset.

$$I'_{i,j} = (\sum_{m=-L}^{L}\sum_{n=-L}^{L} f_{m,n} \times \hat{I}_{i+m,j+n} + o) >> (BD_F - 1), \qquad (2)$$

wherein $(1<<(BD_F-1)) = \sum_{m=-L}^{L}\sum_{n=-L}^{L} f(m,n)$ and $(o=(1<<(BD_F-2)))$ In VVC Test Model 3 (VTM3), the bit-depth, denoted by $BD_F$ is set to 8.

Since VVC Test Model 5 (VTM5.0), clipping is introduced in ALF, and equation (2) is modified as shown in equation (2*)

$$I'_{i,j} = (\sum_{m=-L}^{L}\sum_{n=-L}^{L} [f_{m,n} * \min(\max(-c_{m,n}, \hat{I}_{i+m,j+n} - \hat{I}_{i,j}), c_{m,n})] + \hat{I}_{i,j} + o) >> (BD_F - 1), \qquad (2*)$$

wherein $c_{m,n}$ are the clipping parameters.

Classification

Video encoder 20 and video decoder 30 may be configured to determine one of a plurality of classes of ALF to apply to a block of video data (e.g., a block of luma samples and/or chroma samples). In VTM3, video encoder 20 and video decoder 30 are configured to apply classification to each 4×4 luma block. Video encoder 20 and video decoder 30 may be configured to classify each 4×4 block into one out of 25 classes based on a determined directionality and quantized value of activity for the block. The details are described in the following.

Video encoder 20 and video decoder 30 may be configured to determine the classification of an ALF for a block based on the 1D Laplacian direction of the samples of the block and a 2D Laplacian activity of the samples of the block for each 4×4 luma block. In one example, video encoder 20 and video decoder 30 may be configured to calculate the sum of gradients of every other pixel within an 8×8 window that covers a 4×4 luma block to determine the gradient values of the block. Video encoder 20 and video decoder 30 may be configured to calculate four gradient values: a vertical gradient value denoted by $g_v$, a horizontal gradient value denoted by $g_h$, a 135-degree diagonal gradient value denoted by $g_1$, and a 45 degree diagonal gradient value denoted by $g_{d2}$. Table 1 below shows potential directionality values that may be determined from the gradients and their physical meaning regarding the sample values of the block. For a 4×4 subblock with top-left coordinate (i,j), the gradient values $g_v$, $g_h$, $g_{d1}$ and $g_{d2}$ are defined as:

$$g_v = \sum_{k=i-2}^{i+5} \sum_{l=j-2}^{j+5} V_{k,l},$$

where $V_{k,l}=|2\hat{I}(k, l)-\hat{I}(k, l-1)-\hat{I}(k, l+1)|$, if both k and l are even numbers or both k and l are not even numbers; $V_{k,l}=0$, otherwise $$g_h = \sum_{k=i-2}^{i+5} \sum_{l=j-2}^{j+5} H_{k,l},$$

where $H_{k,l}=|2\hat{I}(k, l)-\hat{I}(k-1, l)-\hat{I}(k+1, l)|$, if both k and l are even numbers or both k and l are not even numbers; $H_{k,l}=0$, otherwise $$g_{d1} = \sum_{k=i-2}^{i+5} \sum_{l=j-2}^{j+5} D1_{k,l},$$

where $D1_{k,l}=|2\hat{I}(k, l)-\hat{I}(k-1, l-1)-\hat{I}(k+1, l+1)|$, if both k and l are even numbers or both k and l are not even numbers; $D1_{k,l}=0$, otherwise $$g_{d2} = \sum_{k=i-2}^{i+5} \sum_{l=j-2}^{j+5} D2_{k,l},$$

where $D2_{k,l}=|2\hat{I}(k, l)-\hat{I}(k-1, l+1)-\hat{I}(k+1, l-1)|$, if both k and l are even numbers or both k and l are not even numbers; $D^2_{k,l}=0$, otherwise.

TABLE 1

Values of Direction and Their Physical Meanings

| Direction values | physical meaning |
| --- | --- |
| 0 | Texture |
| 1 | Strong horizontal/vertical |
| 2 | horizontal/vertical |
| 3 | strong diagonal |
| 4 | diagonal |

To assign the directionality D, video encoder 20 and video decoder 30 may be configured to compare a ratio of maximum and minimum of the horizontal and vertical gradient values, denoted by $R_{h,v}$ in equation (3) below, and the ratio of maximum and minimum of two diagonal gradients, denoted by $R_{d1,d2}$ in equation (4), against each other with two thresholds $t_1$ and $t_2$.

$$R_{h,v}=g_{h,v}^{max}/g_{h,v}^{min} \quad (3)$$

wherein $g_{h,v}^{max}=max(g_h, g_v)$, $g_{h,v}^{min}=min(g_h, g_v)$, $$R_{d0,d1}=g_{d0,d1}^{max}/g_{d0,d1}^{min} \quad (4)$$

wherein $g_{d0,d1}^{max}=max(g_{d0}, g_{d1})$, $g_{d0,d1}^{min}=min(g_{d0}, g_{d1})$, By comparing the detected ratios of horizontal/vertical and diagonal gradients, video encoder 20 and video decoder 30 may determine five direction modes, i.e., D, within the range of [0, 4] inclusive, as defined in equation (5) below.

$$D = \begin{cases} 0 & R_{h,v} \leq t_1 \,\&\&\, R_{d0,d1} \leq t_1 \\ 1 & R_{h,v} > t_1 \,\&\&\, R_{h,v} > R_{d0,d1} \,\&\&\, R_{h,v} > t_2 \\ 2 & R_{h,v} > t_1 \,\&\&\, R_{h,v} > R_{d0,d1} \,\&\&\, R_{h,v} \leq t_2 \\ 3 & R_{d0,d1} > t_1 \,\&\&\, R_{h,v} \leq R_{d0,d1} \,\&\&\, R_{d0,d1} > t_2 \\ 4 & R_{d0,d1} > t_1 \,\&\&\, R_{h,v} \leq R_{d0,d1} \,\&\&\, R_{d0,d1} \leq t_2 \end{cases} \quad (5)$$

Video encoder 20 and video decoder 30 may calculate an activity value Act for the block as:

$$\text{Act} = \sum_{k=i-2}^{i+3} \sum_{l=j-2}^{j+3} (V_{k,l} + H_{k,l}). \quad (6)$$

Video encoder 20 and video decoder 30 may further quantize the activity value Act to the range of 0 to 4 inclusive, and the quantized value is denoted as A. This quantization process is detailed below.

Quantization Process from Activity Value a to Activity Index A

An example quantization process is defined as follows:

avg_var=Clip_post(NUM_ENTRY-1, (Act*ScaleFactor)>>shift);

$\hat{A}$=ActivityToIndex[avg_var], wherein NUM_ENTRY is set to 16, ScaleFactor is set to 24, shift is (3+internal coded-bitdepth), ActivityToIndex[NUM_ENTRY]={0, 1, 2, 2, 2, 2, 2, 3, 3, 3, 3, 3, 3, 3, 3, 4}, and function Clip_post(a, b) returns the smaller value between a and b.

Due to different ways of calculating the activity value, the ScaleFactor and ActivityToIndex are both modified compared to the ALF design in JEM2.0.

Classification Based on Directionality and Activity Index

In an example geometry transform based ALF (GALF) scheme, video encoder 20 and video decoder 30 may be configured to classify each N×N block into one of 25 classes (C) based on the directionality D of the block and quantized value of activity A of the block as follows:

$$C = 5D + \hat{A}. \quad (7)$$

Figure 4:
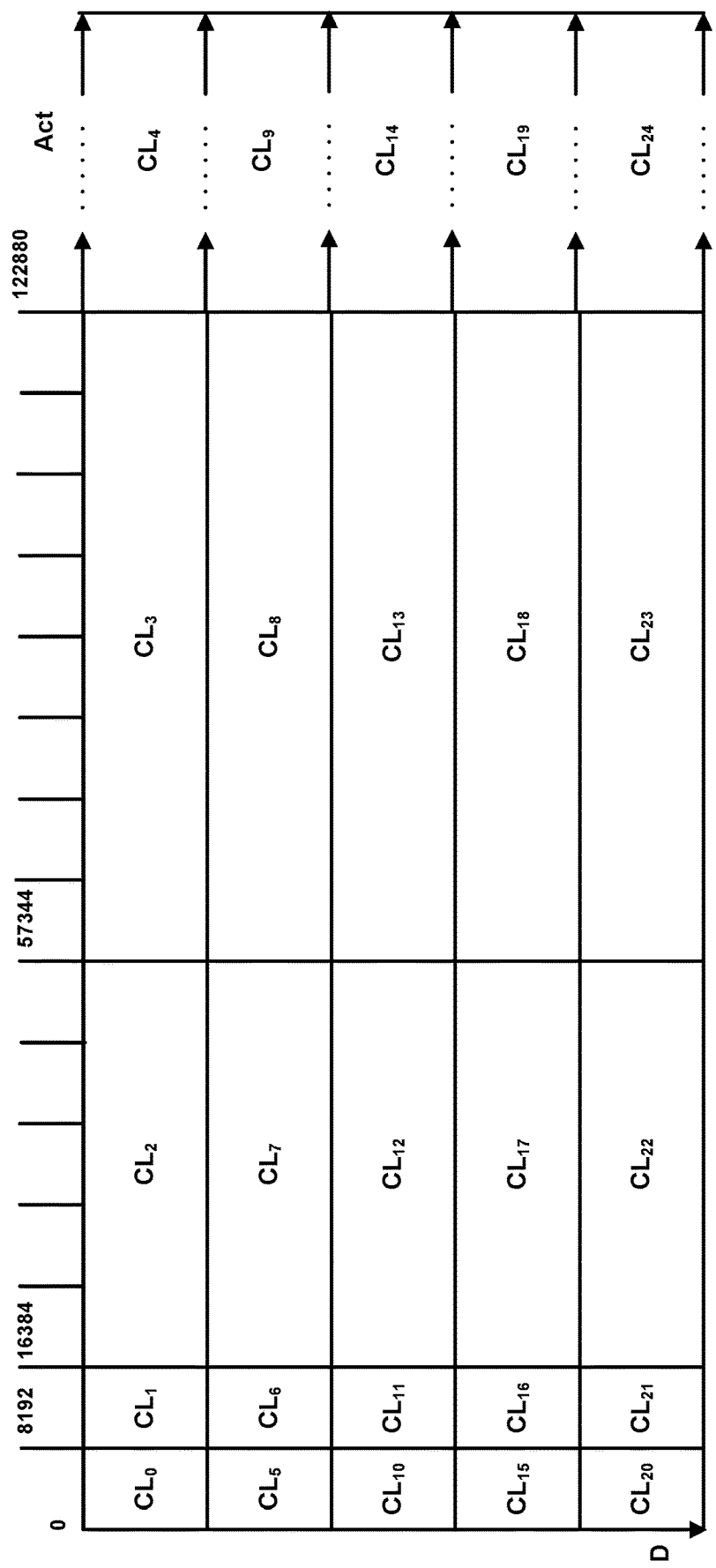
FIG. 4 is a conceptual diagram that illustrates an example of class index for an ALF based on matrix results.

An example of a class index that is determined according to D and the quantized value of activity $\hat{A}$ is depicted in FIG. 4. In one example, the value of A is set to 0 . . . 4 for each column, which is derived from the variable Act. The smallest Act for a new value of $\hat{A}$ is marked across the top row (e.g., 0, 8192, 16384, 57344, 122880). For example, Act with values within [16384, 57344−1] will fall in $\hat{A}$ equal to 2.

Geometry Transformations-Based ALF (GALF)

Figure 5:
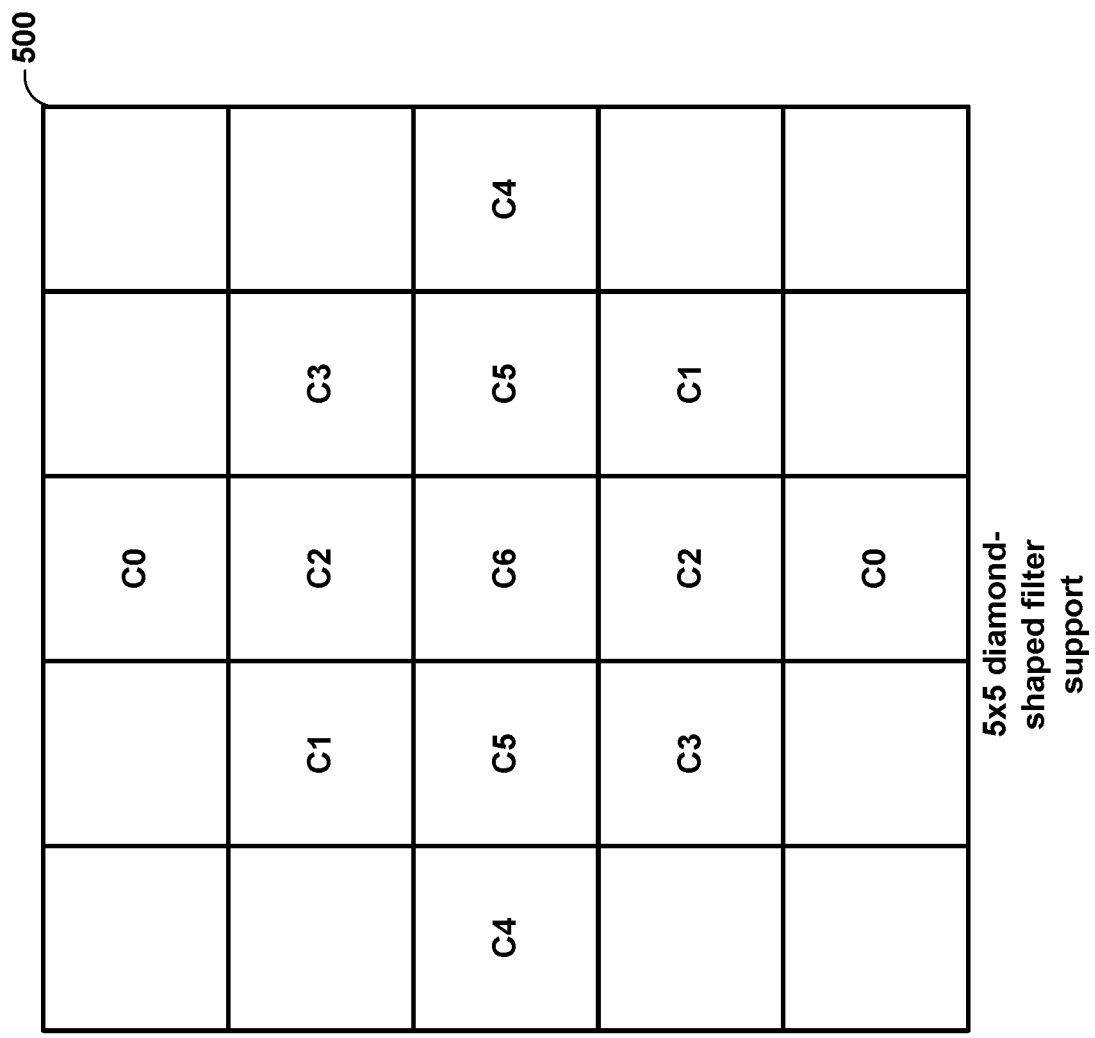
FIG. 5 is a conceptual diagram illustrating a 5×5 diamond-shaped filter support.
Figure 6:
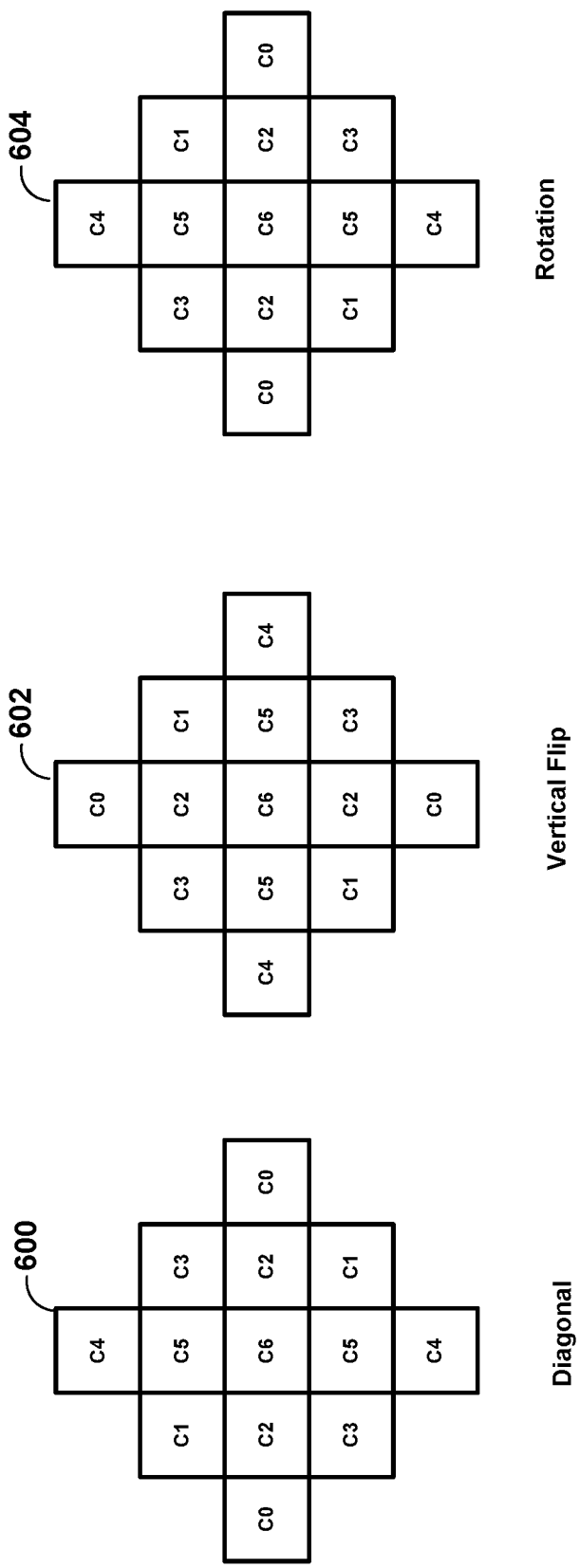
FIG. 6 is a conceptual diagram illustrating examples of geometry transformations.

For each classification, video encoder 20 may be configured to signal one set of filter coefficients. To better distinguish different directions of blocks marked with the same class index, four geometry transformations, including no transformation, diagonal, vertical flip and rotation, may be used. FIG. 5 shows an example 5×5 diamond-shaped filter support 500. An example of 5×5 filter support with the three geometric transformations is depicted in FIG. 6. FIG. 6 shows a diagonal 5×5 diamond-shaped filter support 600, a vertical flip 5×5 diamond-shaped filter support 602, and a rotation 5×5 diamond-shaped filter support 604.

As can be seen from the comparison of filter supports in FIG. 5 and FIG. 6, the formula forms of the three additional geometry transformations of FIG. 6 may be expressed as follows:

Diagonal: $f_D(k,l) = f(l,k)$,

Vertical flip: $f_V(k,l) = f(k, K-l-1)$,

Rotation: $f_R(k,l) = f(K-l-1, k)$, (8)

where K is the size of the filter, and $0 \le k, l \le K-1$ are coefficients coordinates, such that location (0,0) is at the upper left corner of the block and location (K−1, K−1) is at the lower right corner of the block. Note that when the diamond-shaped filter support is used, the coefficients with coordinates outside of the filter support may be set to 0. One technique for indicating the geometry transformation index is to derive the geometry transformation implicitly (e.g., without signaling) in order to avoid additional overhead. In some examples of GALF, the transformations are applied to the filter coefficients f(k, l) depending on gradient values calculated for that block. The relationship between the transformation and the four gradients is described in Table 2 below. In one or more examples, the transformations are based on which one of two gradients (horizontal and vertical, or 45-degree and 135-degree gradients) is larger. Based on the comparison, more accurate direction information can be extracted. Therefore, different filtering results could be obtained due to transformation while the overhead of filter coefficients is not increased.

TABLE 2

MAPPING OF GRADIENT AND TRANSFORMATIONS

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Line Buffer Problems for ALF

Figure 7:
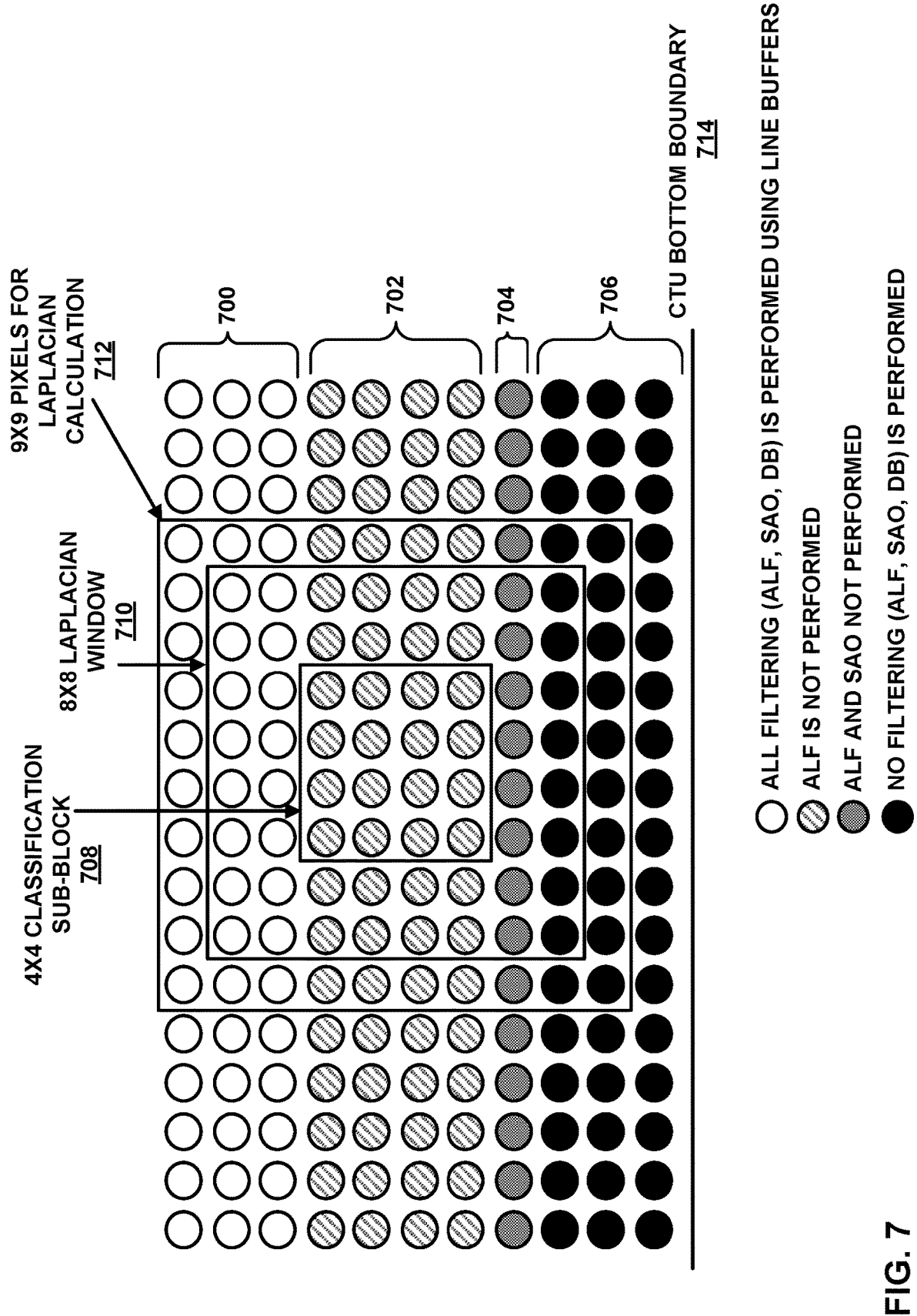
FIG. 7 is a conceptual diagram showing examples of filters used relative to a coding tree unit bottom boundary.

In some examples of VVC, video encoder 20 and video decoder 30 are configured to perform ALF after deblocking filtering and sample adaptive offset (SAO) filtering. In VVC, three filters are applied in the order of deblocking filter, SAO and ALF. FIG. 7 shows the line buffers used for these three in-loop filters.

The example ALF design in VVC uses an additional buffer of 7 lines of pixels (pixels 700 and 702) pixels, as depicted in FIG. 7 for samples above the bottom CTU boundary 714.

To begin deblocking the three lines of pixels 706 (1 to 3 rows above CTU bottom boundary 714), video encoder 20 and video decoder 30 must wait for the availability of pixels in the lower CTU (e.g., a CTU below CTU bottom boundary 714). Such pixels will not be available. As such, video encoder 20 and video decoder 30 would not perform deblocking filtering for pixels 706.

To begin SAO filtering on pixels 704 (4 rows above CTU bottom boundary 714), video encoder 20 and video decoder 30 would require the bottom three lines of pixels 706 to be finished with deblocking. As deblocking is not performed on pixels 706, SAO filtering is not performed on pixels 704.

Although deblocking and SAO has been performed for the four lines of pixels 702 (5 to 8 rows above CTU bottom boundary 714), to begin ALF for pixels 702, video encoder 20 and video decoder 30 would need the lines of pixels 700, 704, and 706 for classification and filtering. For example, to perform ALF on 4×4 classification sub-block 708, video encoder 20 and video decoder 30 would calculate gradient values, as described above, in 8×8 Laplacian window 710. In some examples, a 9×9 or 10×10 block 712 of pixels may be needed for the Laplacian calculation. Accordingly, video encoder 20 and video decoder 30 may not perform ALF for pixels 702. Video encoder 20 and video decoder 30 may not perform ALF for pixels 704 for similar reasons. All filtering may be performed for pixels 700 (9 or more rows above CTU bottom boundary 714).

In U.S. Patent Publication No. 2019/0166363, published May 30, 2019, a solution to reduce the number of line buffers (e.g., a line buffer for pixels 700) for filtering was proposed. However, to begin ALF classification for pixels 702, video encoder 20 and video decoder 30 may still wait for SAO filtering and deblocking filtering of pixels 704 and 706. Such dependency may result in the need for additional line buffers to store temporal/partial sum of gradient values for each 8×8 windows in order to apply ALF to pixels 702. Additional line buffers are undesirable, as more line buffers would increase the implementation cost of video encoder 20 and video decoder 30.

Figure 8:
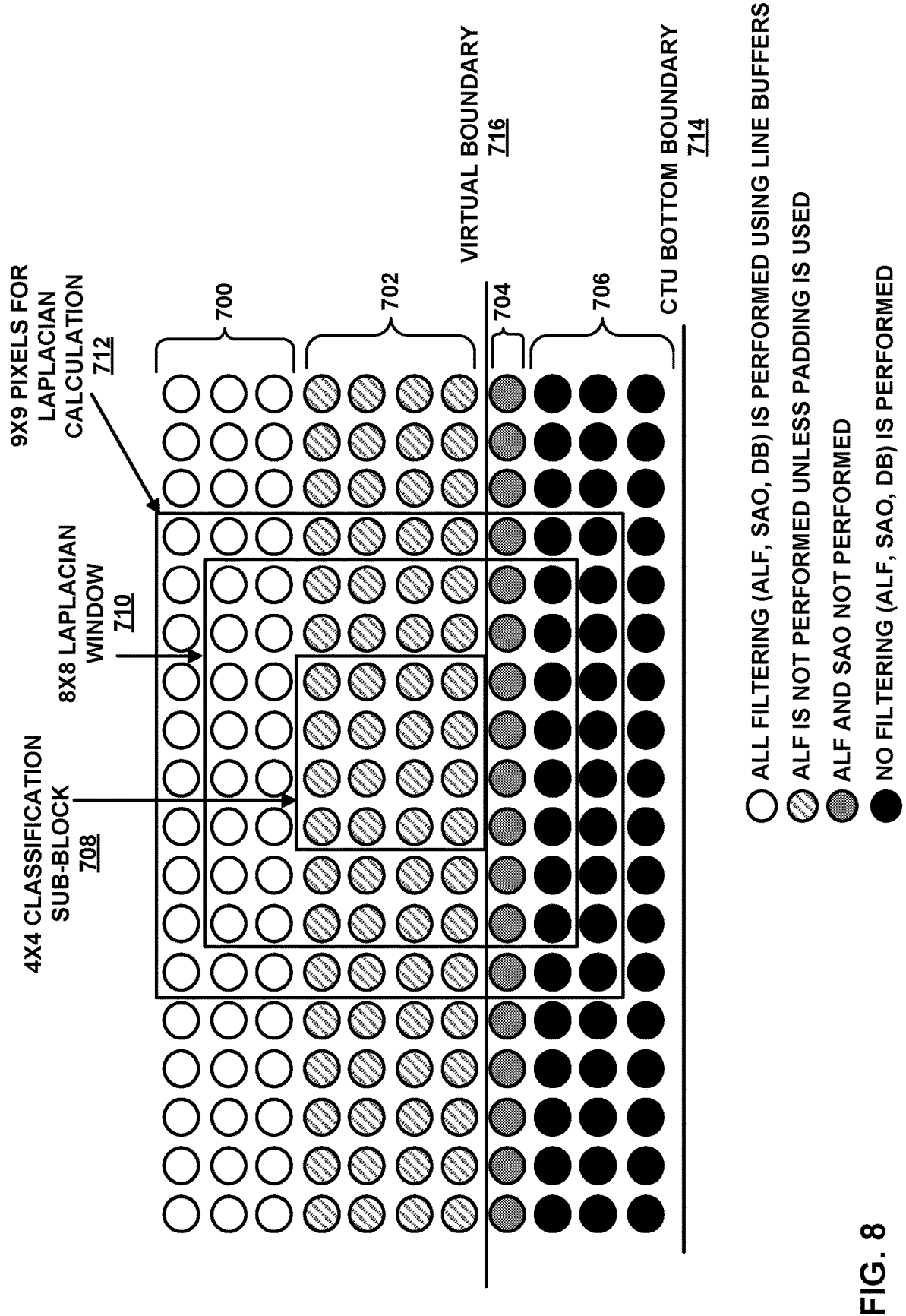
FIG. 8 is a conceptual diagram showing examples of filters used relative to a coding tree unit bottom boundary and a virtual boundary.

In the development of HEVC, some proposals introduced the concept of a virtual boundary (VB). FIG. 8 shows the lines of pixels of FIG. 7 relative to a virtual boundary 716. In this example, virtual boundary 716 is positioned four lines above CTU bottom boundary 714. This design keeps the line buffers for SAO and deblocking filtering, but removes the line buffers for ALF. In one example for ALF, video encoder 20 and video decoder 30 may not use the pixels below virtual boundary 716 to filter pixels above virtual boundary 716. Likewise, for ALF, video encoder 20 and video decoder 30 may not use the pixels above virtual boundary 716 to filter pixels below virtual boundary 716. Instead, for current pixel A, if video encoder 20 or video decoder 30 needs a pixel B that is on the other side of virtual boundary 716 relative to pixel A, video encoder 20 and video decoder 30 replaces the value of pixel B with pixel B's nearest pixel on pixel A side of the virtual boundary 716. Such replaced pixels may be referred to as padded pixels.

For example, when calculating gradients to determine the directionality for 4×4 classification sub-block 708, video encoder 20 and video decoder 30 would use some of pixels 704 and 706 that fall within 9×9 window 712. In some examples, the window of pixels used for Laplacian calculation may be 10×10. However, such pixels are over virtual boundary 716 and are unavailable. Instead, video encoder 20 and video decoder 30 would replace the values of pixels 704 and 706 that are within 8×8 Laplacian window 710, with pixel values from pixels 702 that are on the same side of virtual boundary 716 as 4×4 classification sub-block 708. Again, these replaced pixel values may be referred to as padded pixels. In the example of FIG. 8, window 712 would include 16 padded pixels. In an example where a 10×10 window is used for Laplacian calculation, there would be 30 padded pixels. As such, when padding is used in conjunction with a virtual boundary, video encoder 20 and video decoder 30 may apply ALF to pixels 702.

In some example techniques for line buffer handling for ALF, such as the techniques described above, if padding is applied, the padded area will introduce inaccurate information for gradient value calculation. As such, any classification of ALF, including a geometry transformation for the ALF, may be inaccurate, which could reduce coding performance. In view of the foregoing, in some examples, this disclosure describes techniques for determining gradients for a block of pixels where padded pixels are not used. Furthermore, video decoder 30 may determine a scaling factor based on a number of padded pixels in the window around the block used to determine the gradients and may apply this scaling factor to any calculated gradients. That is, video decoder 30 may determine a scaling factor for the gradient values based on a number of available pixels in the window that are on a same side of a virtual boundary as the reconstructed block. In this way, the accuracy of the gradients, directionality, and class of ALF may be improved.

In some examples, the following techniques may each be applied individually. In other examples, any combination of the following techniques may be applied in any combination.

In one example of the disclosure, the proposed padding methods U.S. Patent Publication No. 2019/0166363 can be extended to other line buffer boundaries, such as the virtual boundary described above. In one example, video encoder 20 and/or video decoder 30 may be configured to generate the padded samples from blocks in one or more reference pictures. In another example, video encoder 20 and/or video decoder 30 may be configured to copy the padded samples from block(s) in one or more reference pictures. When the padded samples are from multiple reference pictures, video encoder 20 and/or video decoder 30 may be configured to apply a linear function to multiple samples from the same position to generate one padded sample.

In some example, video encoder 20 and video decoder 30 may identify the block(s) using motion vectors associated with a current block covering the sample to be filtered, or associated with the neighboring block covering the sample to be padded. In some examples, the motion vector(s) may be rounded to integer positions. In other examples, the motion vectors may be set to zero motion vectors.

In another example, instead of generating padded samples by duplicating existing samples from the first row or the column of a block, video encoder 20 and/or video decoder 30 may be configured to pad samples with a mapping function. In some examples, the mapping function used may depend on the filter support used for GALF/ALF. In some examples, the mapping function could include, but is not limited to, a swap, and/or a flipping, and/or a rotation function. Swap functions, flipping functions, and rotation functions may be any function, weighted or otherwise) where samples within a virtual boundary are mapped to locations outside of the virtual boundary.

Figure 9:
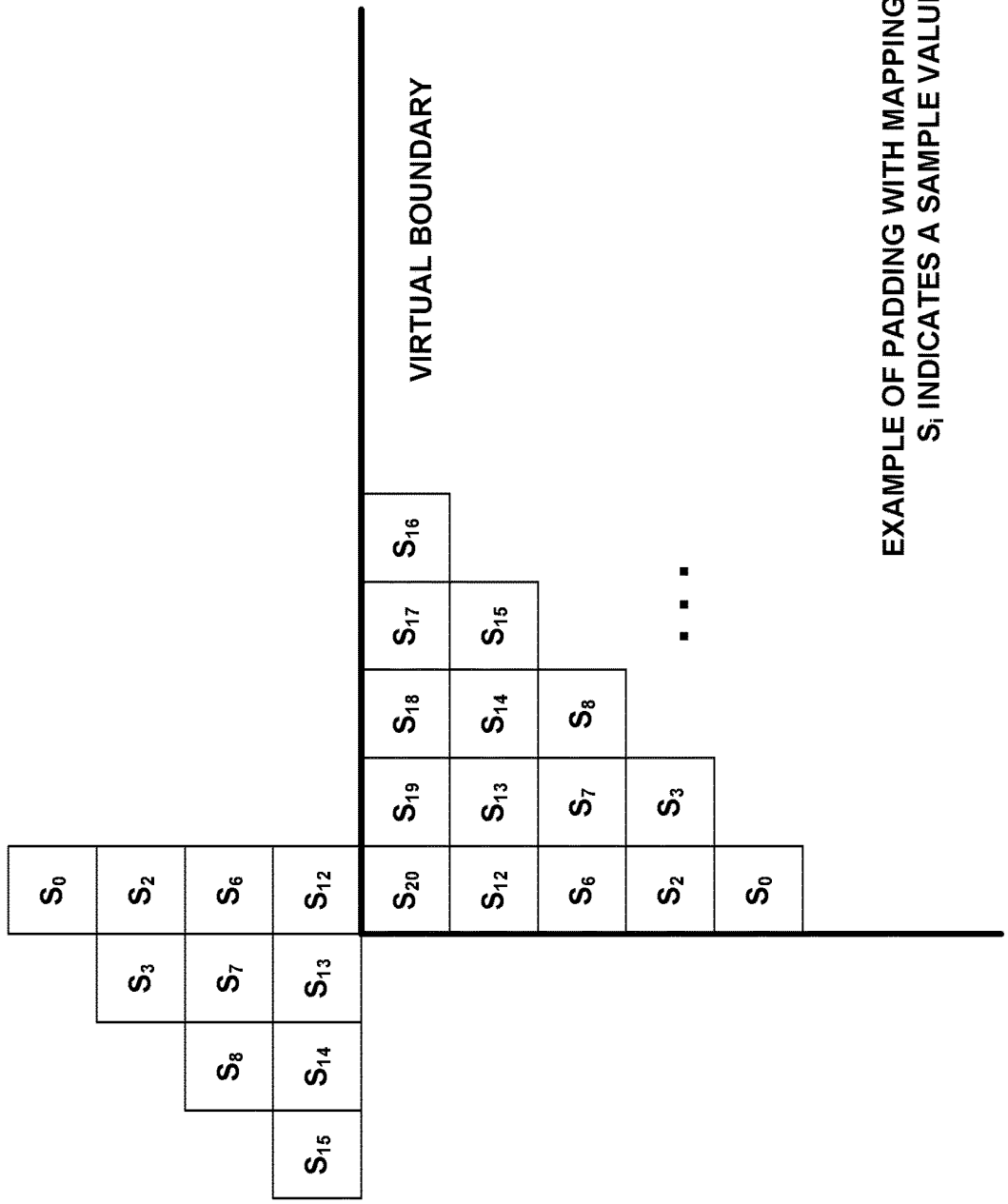
FIG. 9 is a conceptual diagram illustrating an example use of padding with mapping for ALF.
Figure 10:
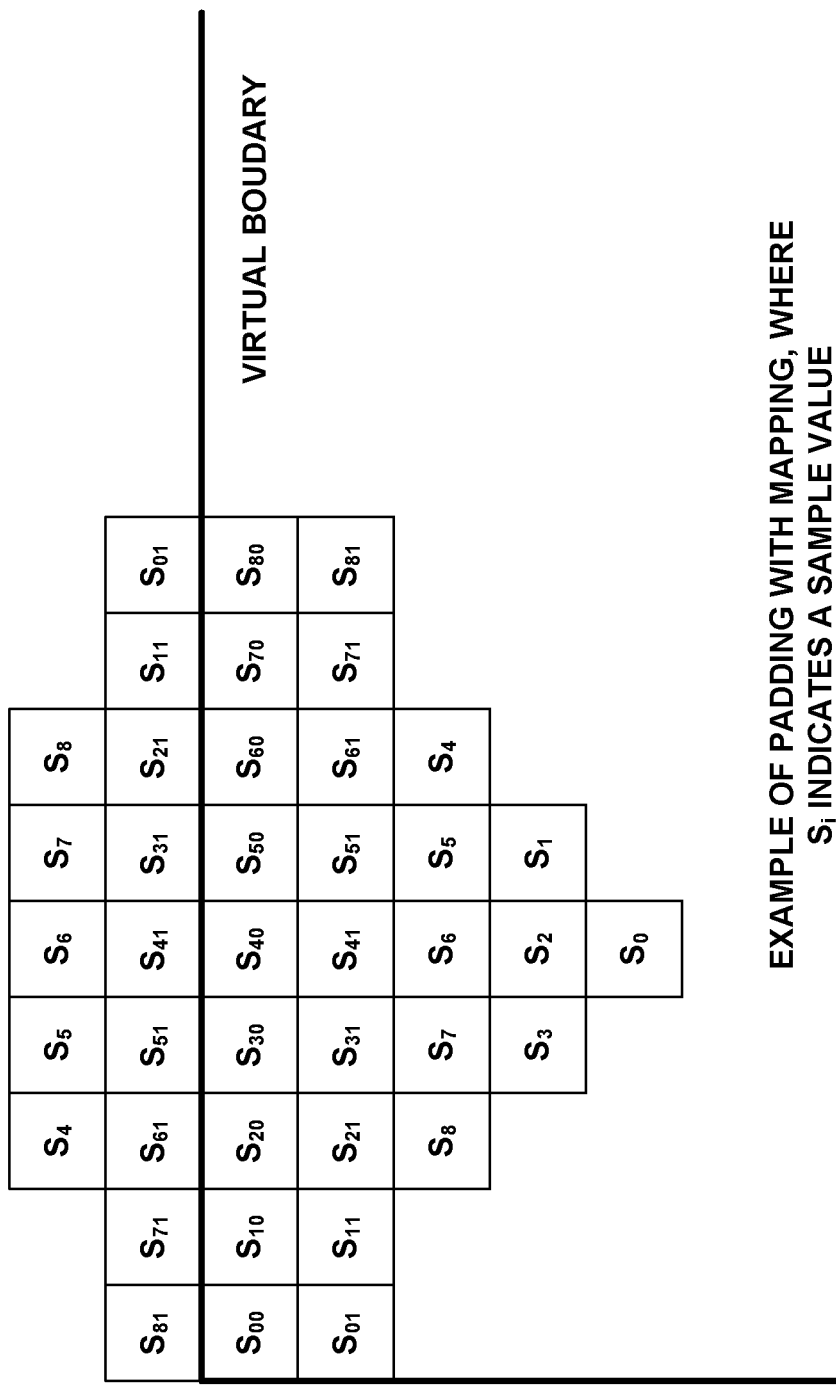
FIG. 10 is a conceptual diagram illustrating another example use of padding with mapping for ALF.

FIG. 9 is a conceptual diagram illustrating an example use of padding with mapping for ALF. In FIG. 9, samples (e.g., luma or chroma samples of a pixel) indicated by the symbol Si are padded (e.g., reused) as filter supports for samples outside of a virtual boundary. The samples outside the virtual boundary that have the same Si designation (e.g., $S_0$) as samples inside the virtual are copied as filter supports. FIG. 9 shows an example of diagonal padding. For example, samples within the virtual boundary may be flipped about a diagonal axis to locations outside the virtual boundary. FIG. 10 is a conceptual diagram illustrating another example use of padding with mapping for ALF. For example, samples within the virtual boundary may be flipped about a horizontal axis to locations outside the virtual boundary.

In another example of the disclosure, when calculating the gradients values $g_v$, $g_h$, $g_{d1}$ and $g_{d2}$ for a block where the window and/or block includes padded pixels, video encoder 20 and video decoder 30 may be configured to not use the padded pixels for the gradient calculation. In addition, video encoder 20 and video decoder 30 may be configured to scale the gradients values of the block using a scaling factor. For example, video encoder 20 and video decoder 30 may calculated a scaled vertical gradient value ($g_v'$) as, $=g_v/$ num_available_pixels*num_full_pixels, where num_available_pixels represents the number of pixels being at the same side as current block (i.e., the number of pixels that are not padded), and num_full_pixel represents the total number of pixels used for the classification of the block (e.g., the total window size). For example, when a 10×10 window is used for Laplacian calculation, the total window size is 100 pixels. In this example, the scaling factor would be num_full_pixels/num_available_pixels. In some example implementations, the scaling factor may be rounded to an integer value which is hardware friendly (e.g., many clock cycles are not needed for processing), such as a number which is multiple of a power of 2. Other scaling factors may be used based on the number of padded pixels. As described above, in some examples the currently filtered block may be a 4×4 luma block and the window used to calculate the gradient may be an 8×8 block that surrounds the 4×4 luma block.

Accordingly, in one example of the disclosure, video encoder 20 and/or video decoder 30 may be configured to reconstruct a block of video data to create a reconstructed block of video data. As describe above, reconstruction may be the reconstruction loop of video encoder 20 or may be the decoded block before filtering in video decoder 30. The reconstructed block of video data may be any size. In one example, for purposes of ALF, the reconstructed block of video data may be a 4×4 sub-block, such as is shown in FIG. 7 and FIG. 8, and the window is an 8×8 Laplacian window and a 10×10 pixel window (e.g., the pixels used to calculate the Laplacian).

As is described above, video encoder 20 and video decoder 30 may be configured to determine gradient values for a window (e.g., Laplacian window 710 and pixel window 712 of FIG. 7), that covers the reconstructed block of video data. The window includes pixels of the reconstructed block of video data and pixels that surround the reconstructed block of video data. Again, pixel window 712 may be 9×9 in some examples or 10×10 in other examples. In one example, to determine the gradient values, video encoder 20 and video decoder 30 may be configured to determine the gradient value without using padded pixels. In addition, video encoder 20 and video decoder 30 may be configured to determine a scaling factor for the gradient values based on a number of available pixels in the window that are on a same side of a virtual boundary as the reconstructed block, and scale the gradient values based on the scaling factor to produce scaled gradient values, wherein the scaled gradient values indicate a directionality for the reconstructed block of video data.

In one example, to determine the gradient values (g), video encoder 20 and video decoder 30 may be configured to determine a vertical gradient ($g_v$), a horizontal gradient ($g_h$), a 135-degree diagonal gradient ($g_{d1}$), and a 45-degree diagonal gradient ($g_{d2}$). Furthermore, to scale the gradient values (g) based on the scaling factor to produce the scaled gradient values (g'), video encoder 20 and video decoder 30 may scale the gradient values (g) using the following equation: g'=g/num_available_pixels*num_full_pixels, where num_available_pixels represents a number of pixels in the window that are not padded (e.g. a number of available pixels in the window that are on a same side of a virtual boundary as the reconstructed block), and num_full_pixel represents a total number of pixels in the window.

Video encoder 20 and video decoder 30 may be further configured to determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data.

In another example of the disclosure, video encoder 20 and video decoder 30 may be configured to determine a geometry transformation for the class of adaptive loop filter based on the scaled gradient values, and apply the determined class of adaptive loop filter with the determined geometry transformation.

In another example of the disclosure, for blocks below the line buffer boundary (e.g., virtual boundary 716 of FIG. 8) which use pixels above the boundary to perform ALF, video encoder 20 and video decoder 30 may be configured to store partial results of $g_v$, $g_h$, $g_{d1}$ and $g_{d2}$ calculated using pixels above the boundary in a local buffer. Therefore, when determining ALF classification, video encoder 20 and video decoder 30 can avoid using padded pixels, but may apply the ALF filtering uses padded pixels.

In another example of the disclosure, for samples for which video encoder 20 and video decoder 30 use padded pixels for ALF classification, ALF classification can be skipped.
1) In one example, the default values of class index and transpose index can be pre-defined or signaled.
2) In another example, the default values of class index and transpose index can be different for different sequences/pictures/slices.
3) In another example, for inter-predicted pixels, the class index and transpose index can be derived from its motion compensated block in a different reference picture.
4) In another example, besides the classes in current VVC, an additional class can be assigned to these values.

In another example of the disclosure, to maintain performance of an ALF, some line buffers could be maintained. For example, the number of lines equal to the height of an ALF classification block (e.g., block 708 in FIG. 7) above the DB and SAO boundary can be maintained. This number can be fixed or different among sequences/pictures/slices. For example, the number of lines can be signaled in sequence parameter set (SPS), picture parameter set (PPS), view parameter set and/or slice header.

An indication of whether to enable or disable the above methods may be signaled in sequence parameter set (SPS), picture parameter set (PPS), view parameter set and/or slice header.

Figure 11:
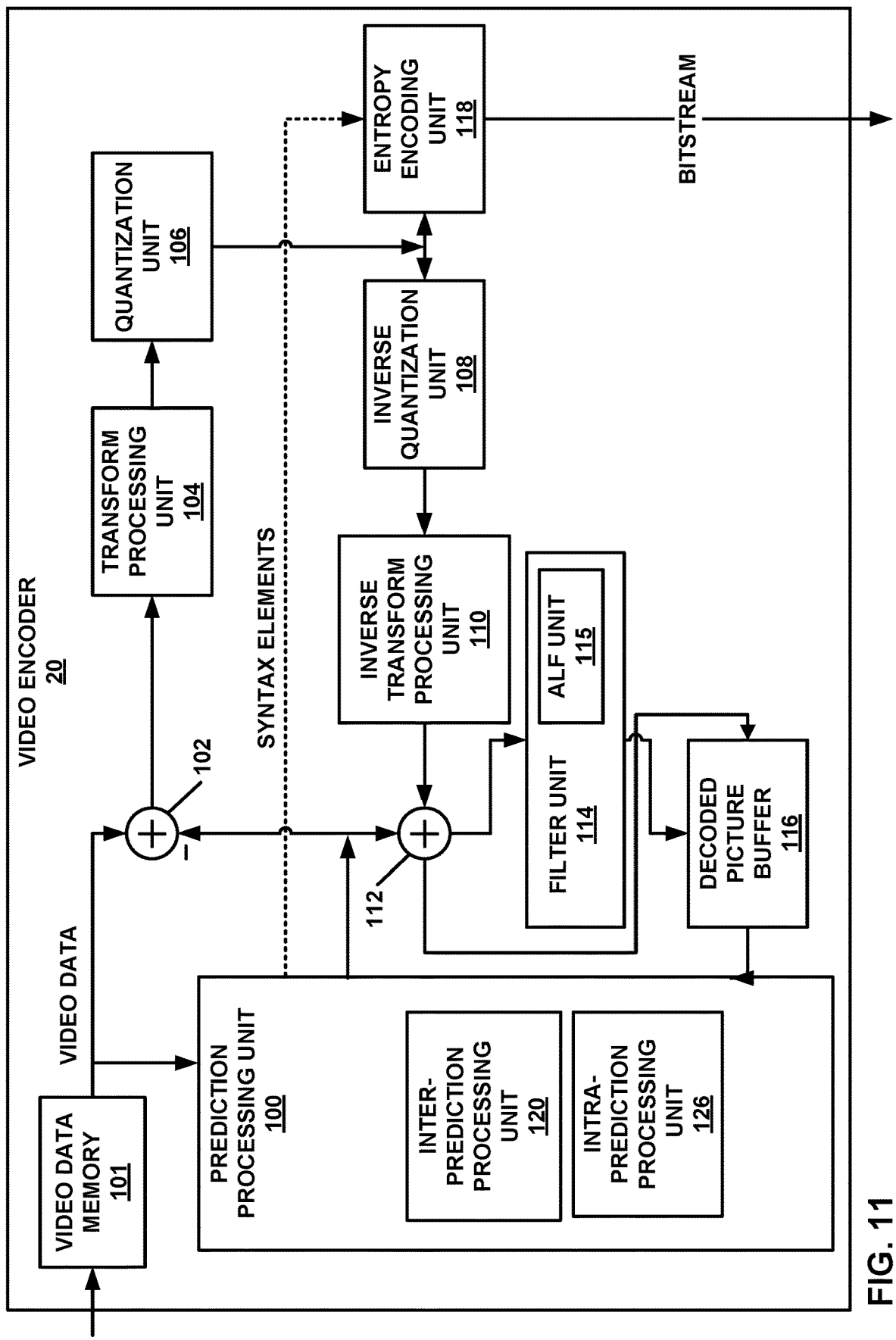
FIG. 11 is a block diagram illustrating an example video encoder that may implement one or more techniques described in this disclosure.

FIG. 11 is a block diagram illustrating an example video encoder 20 that may implement the techniques of this disclosure. FIG. 11 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. The units of video encoder 20 described below may be implemented as one or more circuits or logic elements as part of hardware circuitry, or as part of a processor, ASIC, of FPGA. Moreover, video encoder 20 may include additional or alternative processors or processing circuitry to perform these and other functions. For instance, video encoder 20 includes integrated circuitry, and the various units illustrated in FIG. 11 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric circuit components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 11 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software and/or firmware executing on the hardware to specialize the hardware to perform the example techniques.

In the example of FIG. 11, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as, part of, or separate from storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more SAO, GALF, ALF, and/or deblocking operations on the reconstructed coding blocks associated with a CU. Filter unit 114 may include one or more line buffers to store neighboring samples in order to perform the ALF and/or GALF filtering operations. Filter unit 114 may include ALF unit 115 configured to perform the ALF and GALF techniques of this disclosure that are described above.

For example, ALF unit 115 may be configured to determine gradient values for a window that covers the reconstructed block of video data, wherein the window includes pixels of the reconstructed block of video data and pixels that surround the reconstructed block of video data, determine a scaling factor for the gradient values based on a number of available pixels in the window that are on a same side of a virtual boundary as the reconstructed block, scale the gradient values based on the scaling factor to produce scaled gradient values, wherein the scaled gradient values indicate a directionality for the reconstructed block of video data, determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data. In some examples, ALF unit 115 may be configured to determine the gradient value without using padded pixels.

Decoded picture buffer 116 may store the filtered reconstructed coding blocks after filter unit 114 performs the one or more filtering operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. In some examples, video encoder 20 may be configured to not process samples used by intra-prediction processing unit 126 with filter unit 114. That is, in some examples, intra-prediction processing unit 126 does not use sample values that have been filtered using GALF or ALF.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 12:
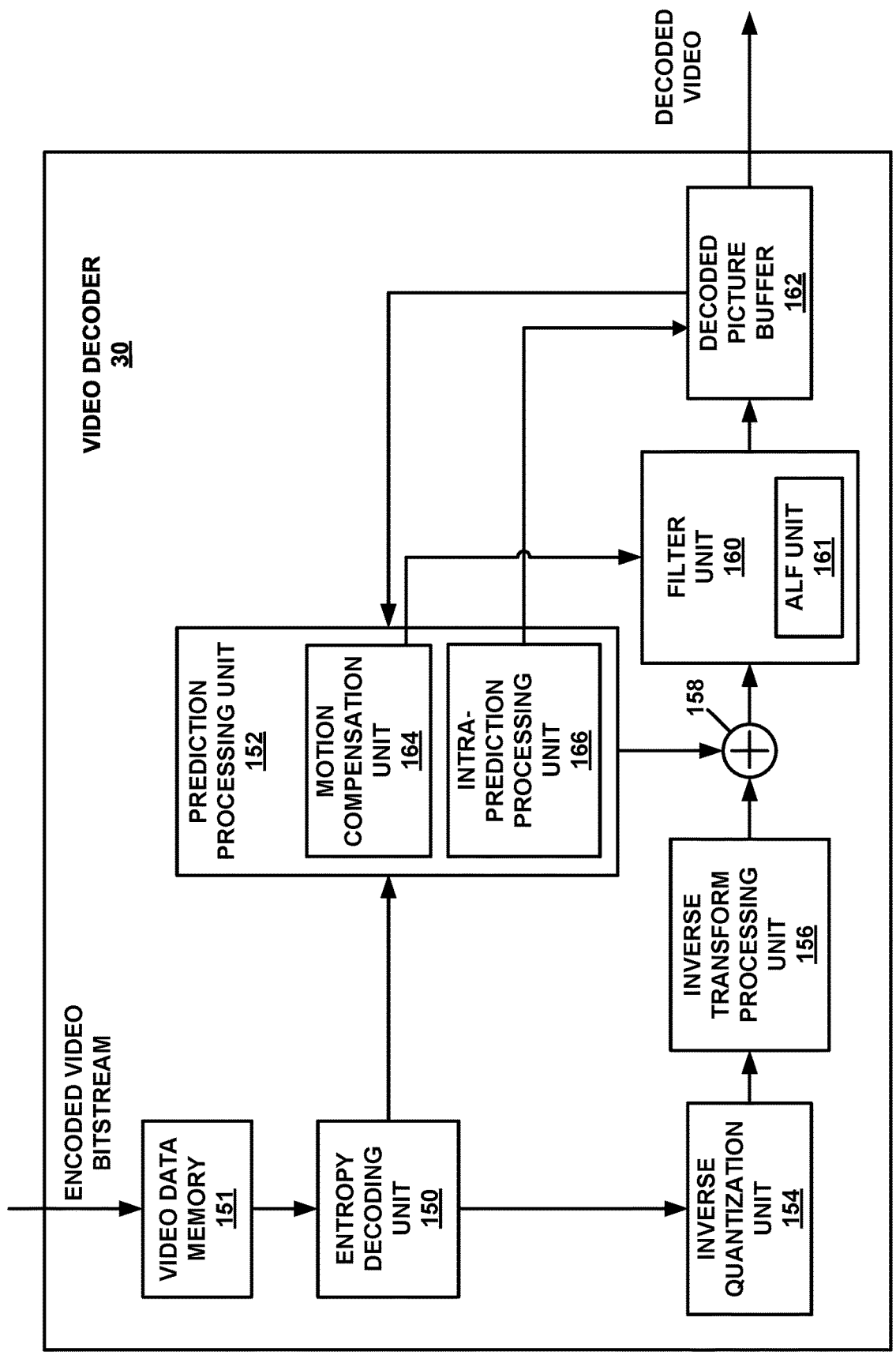
FIG. 12 is a block diagram illustrating an example video decoder that may implement one or more techniques described in this disclosure.

FIG. 12 is a block diagram illustrating an example video decoder 30 that is configured to implement the techniques of this disclosure. FIG. 12 is provided for purposes of explanation and is not limiting on the techniques as broadly exemplified and described in this disclosure.

Processing circuitry includes video decoder 30, and video decoder 30 is configured to perform one or more of the example techniques described in this disclosure. The units of video decoder 30 described below may be implemented as one or more circuits or logic elements as part of hardware circuitry, or as part of a processor, ASIC, of FPGA. Moreover, video decoder may include additional or alternative processors or processing circuitry to perform these and other functions. For instance, video decoder 30 includes integrated circuitry, and the various units illustrated in FIG. 12 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric circuit components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 12 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software and/or firmware executing on the hardware to specialize the hardware to perform the example techniques.

In the example of FIG. 12, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples of spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform one or more SAO, GALF, ALF, and/or deblocking operations on the coding blocks associated with a CU. Filter unit 160 may include one or more line buffers to store neighboring samples in order to perform the ALF and/or GAL filtering operations. Filter unit 160 may include ALF unit 161 that is configured to perform the ALF and GALF techniques of this disclosure that are described above.

For example, ALF unit 161 may be configured to determine gradient values for a window that covers the reconstructed block of video data, wherein the window includes pixels of the reconstructed block of video data and pixels that surround the reconstructed block of video data, determine a scaling factor for the gradient values based on a number of available pixels in the window that are on a same side of a virtual boundary as the reconstructed block, scale the gradient values based on the scaling factor to produce scaled gradient values, wherein the scaled gradient values indicate a directionality for the reconstructed block of video data, determine an activity index for the reconstructed block of video data, determine a class of adaptive loop filter for the reconstructed block of video data based on the directionality and the activity index, and apply the determined class of adaptive loop filter to the reconstructed block of video data to generate a filtered block of video data. In some examples, ALF unit 161 may be configured to determine the gradient value without using padded pixels.

Decoded picture buffer 162 may store the reconstructed coding blocks after filter unit 160 performs the one or more filtering operations on the reconstructed coding blocks. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs. In some examples, video decoder 30 may be configured to not process samples used by intra-prediction processing unit 166 with filter unit 160. That is, in some examples, intra-prediction processing unit 166 does not use sample values that have been filtered using GALF or ALF.

Figure 13:
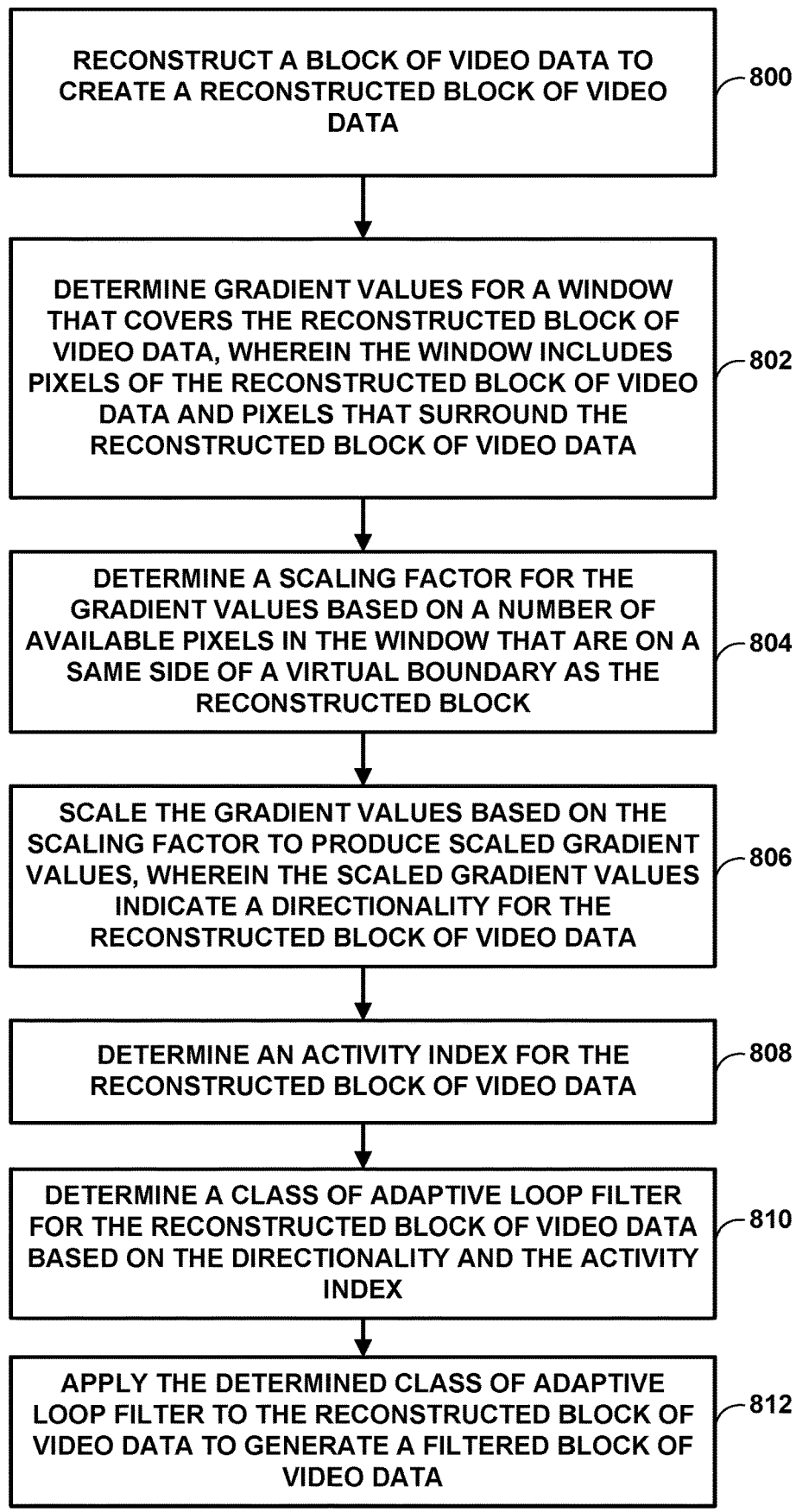
FIG. 13 is a flowchart illustrating an example coding method of the disclosure.

FIG. 13 is a flowchart illustrating an example method for coding a block of video data. In particular, FIG. 13 illustrates an example method for determining a class of an adaptive loop filter and applying the determined class of adaptive loop filter. The techniques of FIG. 13 may be performed by both video encoder 20 and video decoder 30. Although described with respect to video encoder 20 and video decoder 30 (see FIG. 11 and FIG. 12, respectively), it should be understood that other devices may be configured to perform a method similar to that of FIG. 13. In some examples, the techniques of FIG. 14 may be performed by ALF unit 115 of FIG. 11 and/or ALF unit 161 of FIG. 12. In other examples, the techniques of FIG. 13 may be performed by one or more other structural units of video encoder 20 and/or video decoder 30.

In one example of the disclosure, video encoder 20 and/or video decoder 30 may be configured to reconstruct a block of video data to create a reconstructed block of video data (800). Video encoder 20 and/or video decoder 30 may be further configured to determine gradient values for a window that covers the reconstructed block of video data, wherein the window includes pixels of the reconstructed block of video data and pixels that surround the reconstructed block of video data (802), and determine a scaling factor for the gradient values based on a number of padded pixels in the window (804). Said another way, video encoder 20 and video decoder 30 may determine the scaling factor for the gradient values based on a number of available pixels that are on the same size of the virtual boundary as the reconstructed block (i.e., based on the number of pixels that are not padded). Video encoder 20 and/or video decoder 30 may then scale the gradient values based on the scaling factor to produce scaled gradient values, wherein the scaled gradient values indicate a directionality for the reconstructed block of video data (806)

Video encoder 20 and/or video decoder 30 may be further configured to determine an activity index for the reconstructed block of video data (808), and determine a class of adaptive loop filter for the reconstructed block of video data based on the directionality and the activity index (810). Video encoder 20 and/or video decoder 30 may then apply the determined class of adaptive loop filter to the reconstructed block of video data to generate a filtered block of video data (812).

In one example of the disclosure, the reconstructed block of video data is a 4×4 luma block of video data, and wherein the window is an 8×8 window.

In another example of the disclosure, to determine the gradient values, video encoder 20 and/or video decoder 30 may be configured to determine the gradient value without using padded pixels.

In another example of the disclosure, to determine the gradient values (g), video encoder 20 and/or video decoder 30 may be configured to determine a vertical gradient value ($g_v$), a horizontal gradient value ($g_h$), a 135-degree diagonal gradient value ($g_{d1}$), and a 45-degree diagonal gradient value ($g_{d2}$).

In another example of the disclosure, to scale the gradient values (g) based on the scaling factor to produce the scaled gradient values (g'), video encoder 20 and/or video decoder 30 may be configured to scale the gradient values (g) using the following equation: g'=g/num_available_pixels*num_full_pixels, where num_available_pixels represents a number of pixels in the window that are not padded, and num_full_pixel represents a total number of pixels in the window.

In another example of the disclosure, video encoder 20 and/or video decoder 30 may be configured to determine a geometry transformation for the class of adaptive loop filter based on the scaled gradient values, and apply the determined class of adaptive loop filter with the determined geometry transformation.

In another example of the disclosure, video encoder 20 may be configured to store the filtered block of video data in a decoded picture buffer, and encode a subsequent block of video data using the filtered block of video data. Likewise, video decoder 30 may be configured to store the filtered block of video data in a decoded picture buffer, and decode a subsequent block of video data using the filtered block of video data.

Certain aspects of this disclosure have been described with respect to HEVC, extensions of the HEVC, and the developing VVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and BLU-RAY DISC™, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to decode video data, the apparatus comprising:
 a memory configured to store a 64 block of video data; and
 one or more processors, implemented in circuitry, in communication with the memory, the one or more processors configured to:
 reconstruct the block of video data to create a reconstructed block of video data;
 determine gradient values for a window that covers the reconstructed block of video data, wherein the window includes pixels of the reconstructed block of video data and pixels that surround the reconstructed block of video data;
 determine a scaling factor for the gradient values based on a number of available pixels in the window that are on a same side of a virtual boundary as the reconstructed block;
 scale the gradient values based on the scaling factor to produce scaled gradient values, wherein the scaled gradient values indicate a directionality for the reconstructed block of video data;
 determine an activity index for the reconstructed block of video data;
 determine a class of adaptive loop filter for the reconstructed block of video data based on the directionality and the activity index;
 apply the determined class of adaptive loop filter to the reconstructed block of video data to generate a filtered block of video data;
 store the filtered block of video data in a decoded picture buffer; and
 decode a subsequent block of video data using the filtered block of video data.

2. The apparatus of claim 1, wherein the reconstructed block of video data is a 4×4 luma block of video data, and wherein the window is an 8×8 window.

3. The apparatus of claim 1, wherein to determine the gradient values, the one or more processors are configured to determine the gradient values without using padded pixels.

4. The apparatus of claim 1, wherein to determine the gradient values (g), the one or more processors are further configured to determine a vertical gradient value ($g_v$), a horizontal gradient value ($g_h$), a 135-degree diagonal gradient value ($g_{d1}$), and a 45-degree diagonal gradient value ($g_{d2}$).

5. The apparatus of claim 4, wherein to scale the gradient values (g) based on the scaling factor to produce the scaled gradient values (g'), the one or more processors are configured to:
 scale the gradient values (g) using the following equation:
 g'=g/num_available_pixels*num_full_pixels, where num_available_pixels represents a number of pixels in the window that are not padded, and num_full_pixel represents a total number of pixels in the window.

6. The apparatus of claim 5, wherein the one or more processors are further configured to:
 round the scaling factor to an integer.

7. The apparatus of claim 1, wherein the one or more processors are further configured to:
 determine a geometry transformation for the class of adaptive loop filter based on the scaled gradient values, and
 wherein to apply the determined class of adaptive loop filter, the one or more processors are further configured to apply the determined class of adaptive loop filter with the determined geometry transformation.

8. The apparatus of claim 1, further comprising:
a display configured to display a picture that includes the filtered block of video data.

9. A method of decoding video data, the method comprising:
reconstructing the block of video data to create a reconstructed block of video data;
determining gradient values for a window that covers the reconstructed block of video data, wherein the window includes pixels of the reconstructed block of video data and pixels that surround the reconstructed block of video data;
determining a scaling factor for the gradient values based on a number of available pixels in the window that are on a same side of a virtual boundary as the reconstructed block;
scaling the gradient values based on the scaling factor to produce scaled gradient values, wherein the scaled gradient values indicate a directionality for the reconstructed block of video data;
determining an activity index for the reconstructed block of video data;
determining a class of adaptive loop filter for the reconstructed block of video data based on the directionality and the activity index;
applying the determined class of adaptive loop filter to the reconstructed block of video data to generate a filtered block of video data;
storing the filtered block of video data in a decoded picture buffer; and
decoding a subsequent block of video data using the filtered block of video data.

10. The method of claim 9, wherein the reconstructed block of video data is a 4×4 luma block of video data, and wherein the window is an 8×8 window.

11. The method of claim 9, wherein determining the gradient values comprises:
determining the gradient value without using padded pixels.

12. The method of claim 9, wherein determining the gradient values (g) comprises:
determining a vertical gradient value ($g_v$), a horizontal gradient value ($g_h$), a 135-degree diagonal gradient value ($g_{d1}$), and a 45-degree diagonal gradient value ($g_{d2}$).

13. The method of claim 12, wherein scaling the gradient values (g) based on the scaling factor to produce the scaled gradient values (g') comprises:
scaling the gradient values (g) using the following equation:
g'=g/num_available_pixels*num_full_pixels, where num_available_pixels represents a number of pixels in the window that are not padded, and num_full_pixel represents a total number of pixels in the window.

14. The method of claim 13, further comprising:
rounding the scaling factor to an integer.

15. The method of claim 9, further comprising:
determining a geometry transformation for the class of adaptive loop filter based on the scaled gradient values, and
wherein applying the determined class of adaptive loop filter comprises applying the determined class of adaptive loop filter with the determined geometry transformation.

16. The method of claim 9, further comprising:
displaying a picture that includes the filtered block of video data.

17. An apparatus configured to decode video data, the apparatus comprising:
means for reconstructing the block of video data to create a reconstructed block of video data;
means for determining gradient values for a window that covers the reconstructed block of video data, wherein the window includes pixels of the reconstructed block of video data and pixels that surround the reconstructed block of video data;
means for determining a scaling factor for the gradient values based on a number of available pixels in the window that are on a same side of a virtual boundary as the reconstructed block;
means for scaling the gradient values based on the scaling factor to produce scaled gradient values, wherein the scaled gradient values indicate a directionality for the reconstructed block of video data;
means for determining an activity index for the reconstructed block of video data;
means for determining a class of adaptive loop filter for the reconstructed block of video data based on the directionality and the activity index; and
means for applying the determined class of adaptive loop filter to the reconstructed block of video data to generate a filtered block of video data;
means for storing the filtered block of video data in a decoded picture buffer; and
means for decoding a subsequent block of video data using the filtered block of video data.

18. The apparatus of claim 17, wherein the means for determining the gradient values comprises:
means for determining the gradient value without using padded pixels.

19. The apparatus of claim 17, wherein the means for determining the gradient values (g) comprises:
means for determining a vertical gradient value ($g_v$), a horizontal gradient value ($g_h$), a 135-degree diagonal gradient value ($g_{d1}$), and a 45-degree diagonal gradient value ($g_{d2}$).

20. The apparatus of claim 19, wherein the means for scaling the gradient values (g) based on the scaling factor to produce the scaled gradient values (g') comprises:
means for scaling the gradient values (g) using the following equation:
g'=g/num_available_pixels*num_full_pixels, where num_available_pixels represents a number of pixels in the window that are not padded, and num_full_pixel represents a total number of pixels in the window.

21. The apparatus of claim 17, further comprising:
means for determining a geometry transformation for the class of adaptive loop filter based on the scaled gradient values, and
wherein the means for applying the determined class of adaptive loop filter comprises means for applying the determined class of adaptive loop filter with the determined geometry transformation.

22. The apparatus of claim 17, further comprising:
means for displaying a picture that includes the filtered block of video data.

23. A non-transitory computer-readable storage medium storing instructions that, when executed, cause one or more processors configured to decode video data to:
reconstruct the block of video data to create a reconstructed block of video data;

determine gradient values for a window that covers the reconstructed block of video data, wherein the window includes pixels of the reconstructed block of video data and pixels that surround the reconstructed block of video data;

determine a scaling factor for the gradient values based on a number of available pixels in the window that are on a same side of a virtual boundary as the reconstructed block;

scale the gradient values based on the scaling factor to produce scaled gradient values, wherein the scaled gradient values indicate a directionality for the reconstructed block of video data;

determine an activity index for the reconstructed block of video data;

determine a class of adaptive loop filter for the reconstructed block of video data based on the directionality and the activity index;

apply the determined class of adaptive loop filter to the reconstructed block of video data to generate a filtered block of video data store the filtered block of video data in a decoded picture buffer; and decode a subsequent block of video data using the filtered block of video data.

* * * * *